March 3, 1931. G. A. JOHNSON 1,794,902
MANUFACTURE OF METAL SHEATHED CABLES
Filed Jan. 23, 1929
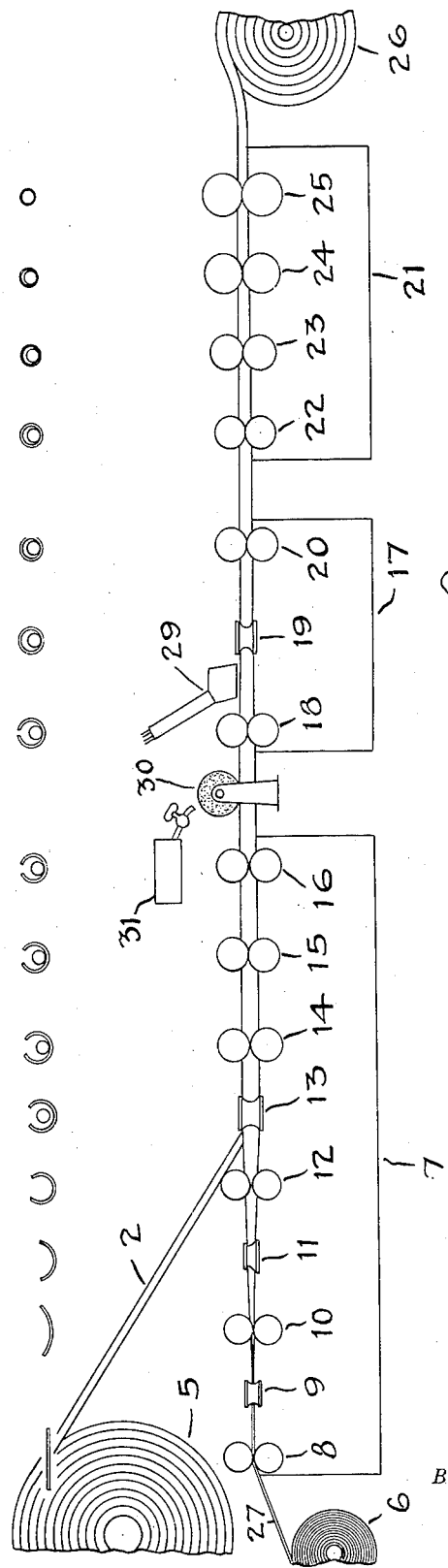
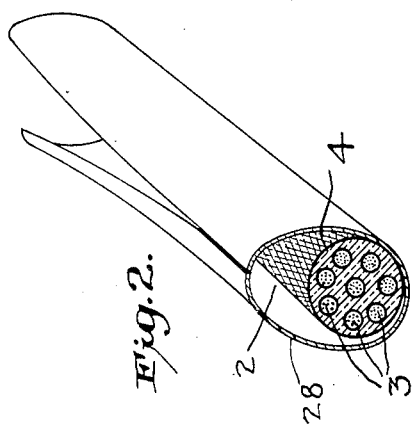
INVENTOR
Gustave A. Johnson
BY
ATTORNEY Patented Mar. 3, 1931

1,794,902

UNITED STATES PATENT OFFICE

GUSTAVE A. JOHNSON, OF IRVINGTON, NEW JERSEY

MANUFACTURE OF METAL-SHEATHED CABLES

Application filed January 23, 1929. Serial No. 334,556.

The invention relates to electric or telephone cables, and more particularly to cables of the kind which are usually sheathed in an extruded lead covering. The sheathing of such cables is accomplished at a comparatively low rate of linear travel, and the operation is intermittent, due to the necessity of recharging the container from which the lead is extruded around the cable. The cost of the apparatus is high.

The object of the present invention is to produce metal-sheathed electric or telephone cable at materially greater speeds and much less cost. A further object is to produce sheathed cable, the sheath of which is lighter and stronger than lead.

The process involves moving the cable and a strip of sheathing metal lengthwise from respective supplies, forming and assembling the strip about the cable, welding the edges of the strip through local application of heat, and reducing the welded sheath about the cable, so that the cable and its sheath are delivered as a unitary and preferably finished product. More especially, the process is so conducted that the sheathing strip and the cable are caused to travel at unequal speeds, the welding being accomplished at a region where the cable is traveling faster than the strip which is being welded up into a tube about the cable; at this region the sheath is materially larger than the cable. Afterwards, when the sheath has been drawn down on the cable and thereby speeded up in longitudinal motion to equal the speed of the cable, the cable and sheath become as one and are then driven and delivered as an integrity, to be reeled up in an appropriate manner.

I am aware that it has been proposed in former years to sheath cables and conductors in continuous process, but as far as I am aware the general if not the universal manufacturing practice has been that of extruded lead coverings. The proposals for forming and welding metal about conductors have involved forming the sheath close to the cable before welding or fusing the edges together, after which the sheathed cable is passed through a sizing die. Such a plan presents difficulties which the present process avoids while securing important positive benefits. By welding the edges of a sheath which is decidedly larger internally than is necessary to accommodate the conductor or conductors with their insulation, and thereafter closing this sheath on the cable, an important economy is realized since fewer feet of sheath are welded than are present in the final product. Furthermore, the considerable spacing of the edges undergoing fusion by application of heat saves the insulation from injury, this resulting also from the fact that the cable is at this time traveling faster than the sheath. Furthermore, the separation of the part of the sheath to which heat is applied from the cable inside makes the welding operation more economical and effective by reason of the fact that the air space around the cable prevents abstraction of heat from the sheath metal.

The invention makes use of known operations and equipment combined to accomplish the present purpose. Other suitable arrangements and operations may be employed.

In the accompanying drawings forming part hereof:

Fig. 1 is a schematic view illustrative of the preferred manner of carrying out the method, together with cross-sections over various portions of the view indicating the condition and relation of the strip, sheath and cable at successive regions lengthwise of the path of travel; and Fig. 2 is a sectional perspective view of the sheath showing the sheath about to be welded and after being welded.

The electric cable 2, comprising suitable wires or conductors 3 and insulation 4, is supplied from a reel 5.

The flat strip metal of which the sheath is to be made is supplied from another reel 6.

These reels are not driven, by preference, and may be provided with suitable braking means in accordance with ordinary practice in withdrawing material of indefinite length from rolls or reels.

The numeral 7 designates generally a forming and assembling unit comprising pairs of rolls 8—16, by which the traveling strip of metal is progressively formed up into open tubular, or bent, shape around the traveling cable, which is led in at a suitable point among the rolls.

The numeral 17 designates a suitable welding unit having, preferably, pairs of rolls 18—20 which guide and act upon the sheath, causing its edges to come into closer approach prior to welding, and, if desired, bringing the tube more nearly to a circular form before it proceeds farther.

At 21 there is a reducing, sizing and finishing unit, comprising rolls 22—25.

From the last unit, the sheathed cable proceeds to a wind-up reel 26, which is preferably driven sufficiently to obviate slack in the traveling cable.

The rolls of the several units are driven by suitable mechanical power in a manner to advance the material. The rolls of the last unit 21 are operated at increasing linear speeds, and are formed to reduce the external and internal diameter of the welded sheath, causing it to clasp the cable closely, at the same time drawing or elongating it so that its linear speed is increased.

The initial metal strip 27 from which the sheath 28 is formed is of excess width, so that when it is formed and welded, it is considerably larger externally and internally than the cable, and the part of the sheath where the welding is effected is separated from the cable so that the insulation of the latter may not be injured by the heat. The rolls are suitably formed to bring about this relation.

The sheathing strip and the cable are withdrawn from their supplies at different speeds, the cable traveling faster than the strip, and this condition obtains up to and beyond the point where the sheath and the cable are assembled and the sheath is welded. The rolls of the units 7 and 17 drive the strip and the sheath, and the final pair, or pairs, of rolls of the unit 21 drive the completed and sheathed cable as a unit, the sheath then grasping the cable so that traction applied to the sheath pulls the cable equally with the sheath. The relatively high rate of speed at which the cable travels past the welding point is a factor in protecting it from the injurious effect of heat.

The welding of the edges of the metal strip forming the sheath is preferably effected by an oxyacetylene or other suitable gas torch 29, which introduces heat locally into the edge portions of the strip so that they are caused to unite or flow together with or without pressure, and with or without the addition of metal, though addition of metal is unnecessary and is preferably omitted. An electric welder may be employed, or other welding means whereby the longitudinal edges of the metal sheathing strip are caused to unite in an integral manner without heating the strip throughout to any considerable temperature which would affect the insulation of the cable.

By preference, the sheath is made in this manner of a strip of aluminum or aluminum alloy, since such a sheath is both light and strong, relative to lead, easily worked in this process, readily bendable in the use and installation of the sheathed cables, and not subject to deterioration. Lightness in the finished cable is a very important advantage, as is also resistance to puncture and abrasion.

I do not, however, limit myself to the particular metal of the sheath, since other metals, such as copper, brass, steel, or even strip lead, may be employed. In the case of the lead, the advantages are speed and economy in manufacture, as with any of the other metals which may be employed.

If a metal is used which requires a flux in order to enable it to be welded, as is the case with aluminum or a weldable aluminum alloy, suitable means are provided for applying flux to the edge regions. For this purpose an absorbent roll 30 is shown turning in contact with the unwelded edges and supplied with a liquid flux from a reservoir 31.

It will be understood that the particular apparatus and procedures employed may be varied and that the drawings and description are intended to be illustrative.

I claim:

1. The method of sheathing electric cables in continuous operation by moving the electric cable and a metal strip lengthwise from respective supplies, and, by operations along the course, forming and assembling the metal strip about the cable, welding the edges of the strip together through local application of heat while the sheath is considerably larger in internal diameter than the cable and the cable is traveling at a higher rate of speed than the sheath, and closing the sheath upon the cable.

2. The method of sheathing electric cables in continuous operation by moving the electric cable and a metal strip lengthwise at different speeds from respective supplies, and, by operations along the course, forming and assembling the metal strip about the cable, welding the edges of the strip together through local application of heat at a region where the sheath is considerably larger in internal diameter than the faster traveling cable and the part of the sheath being welded is spaced from the cable, and reducing and elongating the sheath to clasp the cable.

3. The method of sheathing electric cables or conductors in continuous operation by moving the cable and a metal strip lengthwise, and, by operations along the course, forming the strip about the cable to produce a sheath which initially is decidedly larger than the cable, progressively fusing the edges of this sheath together while it is considerably larger in internal diameter than the enclosed cable, and thereafter working the sheath close to the cable.

4. The method of sheathing electric cables or conductors in continuous operation by moving the cable and a metal strip lengthwise, and, by operations along the course, forming the strip about the cable to produce a sheath which initially is decidedly larger than the cable, progressively fusing the edges of this sheath together while it is considerably larger in internal diameter than the enclosed cable, and thereafter reducing the sheath about the cable by an operation which elongates the sheath considerably.

5. The method of sheathing cables or conductors in lead in continuous operation, by moving the cable and a lead strip lengthwise, and by operations along the course successively forming the lead strip into a sheath which is much larger than the cable, fusing the edges of this sheath together while it is considerably larger in internal diameter than the enclosed cable, and then reducing the sheath so that it closely surrounds the cable.

GUSTAVE A. JOHNSON.